United States Patent Office 3,177,226
Patented Apr. 6, 1965

3,177,226
PROCESS FOR MAKING ALPHA-BETA-UN-
SATURATED CARBOXYLIC ACID ESTERS
Walter Stilz and Horst Pommer, both of Ludwigshafen
(Rhine), Germany, assignors to Badische Anilin- &
Soda-Fabrik Aktiengesellschaft, Ludwigshafen (Rhine),
Germany
No Drawing. Filed June 19, 1961, Ser. No. 117,773
Claims priority, application Germany, Oct. 17, 1958,
B 50,760; Mar. 23, 1960, B 57,167
6 Claims. (Cl. 260—340.5)

This invention relates to an improved process for the production of alpha,beta-unsaturated carboxylic acids and their esters. More specifically, this invention relates to a process for the production of alpha,beta-unsaturated carboxylic acids and their esters starting from new precursors.

Numerous alpha,beta-unsaturated carboxylic acids and esters of the same are found in nature. Many of these compounds not only contain a C—C double linkage in alpha,beta-position to the carboxyl group, which may or may not be esterified, but also one or a plurality of C—C double linkages in conjugation with one another and with the first named double linkage. These compounds will hereinafter be referred to as polyene carboxylic acids or polyene carboxylic acid esters. Some of these compounds have a great importance in industry, for example as intermediates for the production of vitamin A, pesticides, pharmaceuticals, odorants and aromatics. Some polyene dicarboxylic acids belonging to the carotinoid series, such as bixin and crocetin, have also been accepted in the food industry as dyes for foodstuffs.

Numerous techniques have been known for producing alpha,beta-unsaturated carboxylic acids and their esters and of these the majority start from aldehydes or ketones. All of these prior art methods require the use of organometallic compounds, multi-stage processes and auxiliaries which it is sometimes troublesome to remove from the reaction mixture. Moreover, some of the prior art methods only give poor yields while others are not generally applicable for reacting the whole of aldehydes and ketones.

The object of our invention is a new and improved process for producing alpha,beta-unsaturated carboxylic acids and their esters. More specifically our invention provides a process for making said compounds which is easy and elegant to carry out and in which the desired products can be easily separated from the reaction mixture. Another object of our invention is a process by which said compounds can be produced in a one-step operation.

In accordance with our invention the said objects are achieved by reacting an aldehyde or a ketone in the presence of a proton acceptor with an organic phosphorous compound of the general formula

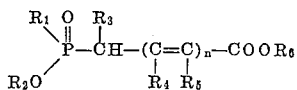

wherein $R_1$ represents alkyl, aryl, alkoxy, cycloalkoxy, aralkoxy or aryloxy; $R_2$ represents alkyl, cycloalkyl, aralkyl or aryl; $R_3$, $R_4$, $R_5$ and $R_6$ have the same meaning as $R_2$ and, besides, may stand for hydrogen; and $n$ represents any of the figures 0, 1, 2, 3 or 4. The reaction is preferably carried out in the presence of an inert liquid or solvent. If desired the resultant carboxylic acid esters can be saponified in conventional manner.

For example, the reaction of para-nitrobenzaldehyde as a carbonyl compound with phosphonic acetic acid triethyl ester in the presence of sodium ethylate as a proton acceptor is as follows:

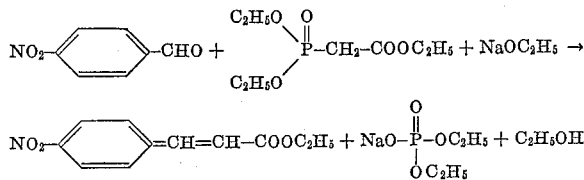

Instead of nitrobenzaldehyde as a compound containing a carbonyl group, any organic compounds which contain at least one aldehyde or ketone grouping and which, except for the carbonyl groups, may have hydrogen structure or contain atoms or groups which are inert under the reaction conditions can be used as initial substances. In the present specification the term carbonyl is meant to include aldehyde and ketone. The carbonyl compounds may be either saturated or unsaturated and may be derived from the aliphatic, cycloaliphatic, araliphatic and aromatic series or also from the heterocyclic series. The carbonyl compounds may be either of simple or complex structure. The following groups have been found to be inert under the reaction conditions: alkylamino, hydroxyalkyl amino, acylamino (such as formylamino and butyrylamino), cyano, amino, —$SO_2OMe$ and $COOMe$ wherein Me is an alkali metal or half an equivalent of an alkaline earth metal, carboxyl, carbonamide, carboxylic ester, sulfonamide, ether bridges, thioether bridges, hydroxyl, acyloxy, mercapto, nitro, nitroso acetal and ketal groups and halogen. The following are examples of the numerous carbonyl compounds which can be used in the practice of our invention:

formaldehyde,
acetaldehyde,
propionaldehyde,
butyraldehyde,
γ-bromobutyraldehyde,
isobutyraldehyde,
acrolein,
propargylaldehyde,
alpha-methylacrolein,
crotonaldehyde,
hexadienal,
octatrienal,
cyclohexanone,
cyclooctanone,
cyclododecanone,
hexahydrobenzaldehyde,
phenylacetaldehyde,
4-para-tolyl-hexanal-(1),
benzaldehyde,
p-tolylaldehyde,
para-nitrobenzaldehyde,
2,6-dichlorbenzaldehyde,
piperonal,
para-dimethylamino-benzaldehyde,
9-fluorenone,
terephthaldialdehyde,
anthraquinone-2-aldehyde,
1-naphthaldehyde,
salicylaldehyde,
2-ethoxynaphthalene-1-aldehyde,
furfurol,
pyridine-(2)-aldehyde,
pyridine-(3)-aldehyde,
pyridine-(4)-aldehyde,
quinoline-(2)-aldehyde,
quinoline-(4)-aldehyde,
anthracene-(9)-aldehyde,
cinnamaldehyde,
phenylacetaldehyde, acetone,
butyrone,
methyl ethyl ketone,
cyclocitral,
citral,
glyoxylic acid,
glyoxylic acid esters,
methyl malondialdehyde,
hydroxy acetone,
etherified or esterified glycol aldehydes,
acetoacetic acid esters,
oxomalonic acid esters,
phenylpentadienal,
beta-alkoxyacroleins, for example
beta-ethoxyacrolein, and
alpha-methyl-beta-ethoxy-acrolein,
alpha-methyl-beta-acetoxyacrolein,
alpha-methyl-beta-chloracrolein,
vinyl methyl ketone,
beta-chlorvinyl methyl ketone,
beta-methoxyvinyl methyl ketone,
chloracetaldehyde,
beta-formylacrylic acid,
beta-formylacrylic acid esters,
beta-formylcrotonic acid esters,
butinone,
4,4-dihydroxy-ethylene-pentene-(3)-al-(1),
4-acetoxy-pentene-(3)-al-(1),
maleic dialdehyde,
tetrolaldehyde,
5-acetoxy-4-methyl-pentadiene-(2,4)-al-(1),
5-ethoxy-4-methyl-pentadiene-(2,4)-al-(1),
5-carbmethoxy-4-methyl-pentadiene-(2,4)-al-(1),
6-methoxy-4-methyl-pentadiene-(2,4)-al-(1),
6-acetoxy-4-methyl-pentadiene-(2,4)-al-(1),
4-methyl-hexadiene-(2,4)-al-(1),
6-dimethylamino-4-methyl-hexadiene-(2,4)-al-(1),
7-ethoxy-4-methyl-heptatriene-(2,4,6)-al-(1),
7-acetoxy-4-methyl-heptatriene-(2,4,6)-al-(1),
7-carboxy-4-methyl-heptatriene-(2,4,6)-al-(1),
7-carbethoxy-4-methyl-heptatriene-(2,4,6)-al-(1),
4-methyloctatriene-(2,4,6)-al-(1),
9-carboxy-4,8-dimethyl-nonatetraene-(2,4,6,8)-al-(1),
9-carbalkoxy-4,8-dimethyl-nonatetraene-(2,4,6,8)-al-(1),
4,8-dimethyl-decatetraene-(2,4,6,8)-al-(1),
9-carboxy-4,9-dimethyl-nonatetraene-(2,4,6,8)-al-(1),
13-carboxy-4,8,12-trimethyl-tridecahexaene-(2,4,6,8,10,12)-al-(1),
13-carboxy-4,9,13-trimethyl-tridecahexaene-(2,4,6,8,10,12)-al-(1),
4,8-dimethyl-dodecatetraene-(2,4,8,10)-ine-(6)-dial-(1,12),
4,8-dimethyl-dodecapentaene-(2,4,6,8,10)-dial-(1,12),
2,7-dimethyl-octadiene-(2,6)-ine-(4)-dial-(1,8),
2,7-dimethyl-octatriene-(2,4,6)-dial-(1,8),
2,6,11,15-tetramethylhexadecaheptaene-(2,4,6,8,10,12,14)-dial-(1,16),
2,6,11,15-tetramethylhexadecahexaene-(2,4,6,10,12,14)-ine-(8)-dial-(1,16),
5-(2',6',6'-trimethylcyclohexene-(1')-yl-(1'))-3-methyl-pentadiene-(2,4)-al-(1),
8-(2',6',6'-trimethyl-cyclohexene-(1')-yl-(1'))-6-methyl-octatriene-(3,5,7)-one-(2),
6-methylheptene-(5)-one-(2),
beta-formyl crotonic acid nitrile,
dimethylamino acetaldehyde,
thiophene-2-aldehyde,
the sodium salt of beta-formyl crotonic acid,
p-nitrosobenzaldehyde,
13-(2',6',6'-trimethylcyclohexene-(1')-yl-(1'))-3,7,11-trimethyl-tridecahexaene-(2,4,6,8,10,12)-al-(1).

The preferred carbonyl compounds contain, generally speaking, 1 to 30 carbon atoms and 1 to 2 aldehyde or keto groups. Of the preferred classes of aldehydes and ketones the following are mentioned:

Aliphatic carbonyl compounds with from 1 to 30 carbon atoms and from 1 to 2 aldehyde or keto groups having saturated hydrocarbon structure or containing 1 to 10 double or triple bonds and being possibly substituted by alkoxy with 1 to 4 carbon atoms, hydroxy, carboxyl, carbonamide, carboalkoxy with 2 to 5 carbon atoms, cyano, ketal or acetal;

Cycloaliphatic aldehydes and ketones having a 4 to 12 membered carbocyclic ring and except for one carbonyl group having hydrocarbon structure;

Aromatic aldehydes and ketones (i.e., carbonyl compounds having the carbonyl group directly attached to an aromatic ring) which bear a benzene, a naphthalene or an anthracene ring with from 7 to 15 carbon atoms and 1 to 2 aldehyde or keto groups having hydrocarbon structure except for the aldehyde or keto groups, a nitro, hydroxy, acetal or ketal group, halogen, an ether bridge, carboxyl, carbonamide, carboalkoxy with 2 to 5 carbon atoms;

Araliphatic aldehydes and ketones (i.e., carbonyl compounds having a carbonyl group separated from an aromatic ring by at least one carbon atom) which contain a benzene ring, having from 8 to 15 carbon atoms, 1 to 2 carbonyl groups and except for the carbonyl groups having hydrocarbon structure;

Heterocyclic aldehydes and ketones with from 5 to 15 carbon atoms, 1 to 2 carbonyl groups and a 5- to 7-membered heterocyclic ring which may be condensed to a 5- to 6-membered carboxylic ring and may contain 1 to 2 of the hetero atoms O, S and N, the said heterocyclic aldehydes and ketones having hydrocarbon structure except for the hetero atoms and the carbonyl groups, or additionally containing hydroxy or an ether bridge.

The compounds of the general Formula I are phosphonates or phosphinates, depending on whether $R_1$ is connected to the phosphorous atom by way of an oxygen or a carbon atom. From among the compounds of the general Formula I which are applicable in the practice of our invention, the following are given by way of example:

esters of phosphonic acetic acid,
gamma-phosphonic-beta-methyl-crotonic acid,
omega-phosphonic-beta-methyl-sorbic acid,
omega-phosphonic-gamma-methyl sorbic acid,
7-phosphonic-2,6-dimethyl-heptatriene-(1,3,5)-carboxylic acid-(1),
7-phosphonic-1,5-dimethyl-heptatriene-(1,3,5)-carboxylic acid-(1),
alpha-phosphonic-propionic acid,
9-phosphonic-2,6-dimethyl-nonatetraene-(1,3,5,7)-carboxylic acid-(1),
7-phenylphosphinic-2,6-dimethyl-heptatriene-(1,3,5)-carboxylic acid,
2,4-dichlorophenylphosphinic-acetic acid,
gamma-(4-methoxyphenyl-phosphinic)-beta-methyl-crotonic acid and
omega-butylphosphinic-beta-methyl sorbic acid.

Compounds of the Formula I which are especially preferred in the practice of our invention are those in which $R_1$ represents phenyl or naphthyl which may be substituted by 1 to 2 alkyls with 1 to 4 carbon atoms, by 1 to 1 halogen or by 1 to 2 alkoxy with 1 to 4 carbon atoms, and further represents alkyl with 1 to 4 carbon atoms or alkoxy with 1 to 4 carbon atoms. In the preferred compounds of the Formula I $R_2$ stands for alkyl with from 1 to 4 carbon atoms, $R_3$, $R_4$ and $R_5$ stand for hydrogen or alkyl with from 1 to 4 carbon atoms, more specifically methyl, and $R_6$ stands for alkyl with 1 to 10 carbon atoms. For the production of polyene carboxylic acids or esters thereof the compounds in which $n$ is equal to 1, 2, 3 or 4 are particularly useful.

The compounds of Formula I can be prepared in a simple and efficient way for example by reacting a compound of the general formula:

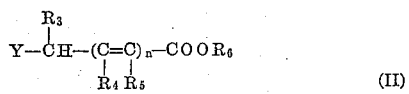
(II)

in which $R_3$, $R_4$, $R_5$, $R_6$ and $n$ have the same meaning as in the general Formula I and Y represents a halogen atom or the O-tosyl radical, with a phosphorous compound of the general formula

In this formula $R_1$ and $R_2$ have the same meaning as in the general Formula I, whereas $R_7$ represents alkyl, especially methyl, ethyl, propyl or butyl, or cycloalkyl, aralkyl or aryl.

Preferred proton acceptors are basic compounds, such as alkali or alkaline earth hydroxides, alkali or alkaline earth alcoholates, alkali or alkaline earth amides, strongly basic amines, quaternary ammonium bases, alkali and alkaline earth hydrides, alkali and alkaline earth acetylides and alkali organic compounds. Suitable proton acceptors are for example sodium hydroxide, barium hydroxide, sodium methylate, magnesium ethylate, potassium tert. butylate, sodium amide, calcium amide, dibutylamine, trimethylbenzylammonium hydroxide, lithium hydride, calcium hydride, sodium hydride, mono-sodium acetylide, potassium methylacetylide, methyl magnesium iodide, lithium phenyl, sodium sodium acetate, sodium cyclopentadienyl.

It is good practice to carry out the process for the production of the alpha,beta-unsaturated carboxylic acids and their esters in inert liquids or solvents. Examples of these are hydrocarbons, such as benzene, toluene and xylene, alcohols, such as methanol, ethanol, isopropanol, butanols, glycols, hexanol, cyclohexanol and cyclo-octanol, ethers, such as di-isopropyl ether, tetrahydrofurane, dimethyltetrahydrofurane and dioxane. Polar organic solvents are especially suitable, such as formamide, dimethylformamide, dimethyl sulfoxide and N-methylpyrrolidone. However, the reactions in accordance with our invention proceed smoothly and satisfactorily in an aqueous medium as well. The term inert liquid or solvent is meant to include compounds which are liquid under the reaction conditions and do not interfere with the reaction or affect the reactants.

The reaction temperature depends on the nature of the components to be reacted, especially on the nature of the compounds containing carbonyl groups and the proton acceptors. As a rule it lies between about $-30°$ and $180°$ C., particularly between $0°$ and $100°$ C., the optimum temperature to be ascertained by a preliminary experiment.

The carboxylic acid esters formed by the process in accordance with our invention can be obtained by themselves or be saponified, if desired, for example by treating them with an aqueous alcoholic caustic potash solution.

Another embodiment of our invention provides intermixing the compound containing a carbonyl group, the compound of the general Formula I and, advantageously, a solvent, and introducing into the mixture, while stirring, the proton acceptor either by itself or in a dissolved or suspended form. It is also possible, however, to add the proton acceptor to the compound of the general Formula I and to then add the compound containing a carbonyl group. The reactants are generally used in about stoichiometrical amounts, i.e., 1 mol of a compound containing a carbonyl group and 1 mol of a proton acceptor containing one monovalent cation for each mol of a compound of the Formula I, or 1 mol of a compound containing 2 carbonyl groups and 2 mols or a proton acceptor containing one monovalent cation to 2 mols of a compound of the Formula I. An excess or deficiency of one or the other reactant may sometimes be of advantage.

The reaction generally proceeds with strong evolution of heat and it may be necessary to cool. The reaction mixture is processed in conventional manner, for example by adding water or methanol and, preferably, an acid, such as acetic acid or sulfuric acid, and separating the deposited product. When sensitive substances, such as the polyene carboxylic acid, called vitamin A acid, are prepared by the process in accordance with our invention it is recommendable to carry out the reaction in the presence of an inert gas, such as nitrogen or argon.

The substantial advantages of the process according to this invention as compared to the prior art methods lie in the better yields generally obtained, in the ease of stripping the phosphorus components in the form of a salt which dissolves well in the solvent or solvent mixture used, in the high purity of the reaction products thereby obtainable and in the insensitivity of the reaction to water.

The substances obtainable according to this invention are partly applicable, as in the case of vitamin A acid, crocetin, bixin, isocrocetin diethyl ester and isonorbixin diethyl ester as dyes for foodstuffs, as pharmaceuticals, as pigment dyestuffs, as stabilizers for plastics and as intermediate products for further reactions.

The following examples will further illustrate this invention but the invention is not restricted to these examples. The parts are by weight unless otherwise specified; the parts by weight bear the same relation to the parts by volume as the gram to the cc.

*Example 1*

615 parts of ethyl chloracetate are added gradually to 915 parts of triethyl phosphite at 140° to 150° C. and the ethyl chloride formed is distilled off through a column provided with filler bodies. After all has been added, the whole is heated at 180° to 200° C. for another half an hour and then the reaction mixture is distilled under reduced pressure. Between 158° and 160° C. at 19 mm. Hg there pass over 1008 parts of phosphonic acetic acid triethyl ester as a water clear liquid.

A mixture of 12 parts of 30% sodium ethylate solution (ethanol as solvent) and 20 parts by volume of dimethylformamide is added to a mixture of 1 part of 2,6,11,15-tetramethyl - hexadecaheptaene - (2,4,6,8,10,12,14) - dial-(1,16), 5 parts of the phosphonic acetic acid ester and 50 parts by volume of dimethylformamide while stirring vigorously in such a way that the reaction temperature does not rise above 40° C. The solution becomes dark red in color and after a few minutes reddish violet crystals are deposited. The mixture is stirred for half an hour, then adjusted to pH 7 with glacial acetic acid, 30 parts by volume of ethanol are added and filtered by suction. By recrystallizing the crystals from glacial acetic acid, 1.2 parts of norbixin diethyl ester are obtained in the form of dark violet crystals of the melting point 197° to 198° C.

*Example 2*

84 parts of gamma-brom-beta-methylcrotonic acid ethyl ester are gradually added to 100 parts of triethyl phosphite heated to 100° C. The ethyl bromide formed is driven off through a column. The internal temperature is raised gradually to 180° C. and the mixture then distilled under reduced pressure. At 0.1 mm. Hg there pass over between 104° and 105° C., 97 parts of 1-carbethoxy-2-methyl-propene-(1)-diethyl-phosphonate-(3) as a colorless oily liquid.

20 parts of 30% sodium ethylate solution (ethanol as solvent) are added with powerful stirring to a solution of 16 parts of 1-carbethoxy-2-methyl-propene-(1)-diethylphosphonate-(3) and 4.1 parts of 2,7-dimethyl-octatriene-(2,4,6)-dial-(1,8) in 80 parts by volume of dimethylformamide. The contents of the flask become dark brown in color and the temperature rises to 50° C. After a few minutes, orange colored crystals separate out. The reaction material is stirred for another half an hour, adjusted to pH 7 with glacial acetic acid and 50 parts by volume of ethanol are added. The orange colored substance recovered by filtration by suction crystallizes from tetrahydrofurane in beautiful parallelepipeds of the melting point 205° to 206° C. In this way there are obtained 6.9 parts of pure 1,14-bis-carbethoxy-2,5,10,13-tetramethyl-tetradecaheptaene-(1,3,5,7,9,11,13) (isocrocetin diethyl ester).

*Example 3*

126 parts of omega-brom-beta-methyl-sorbic acid ethyl ester are carefully heated with 120 parts of triethyl phosphite. At an internal temperature of 100° to 110° C., a vigorous reaction sets in. The internal temperature is kept at 110° C. by strong cooling and after the reaction has subsided raised to 180° C. The reaction mixture is then distilled under reduced pressure. At 0.01 mm. Hg 120 parts of 1-carbethoxy-2-methyl-pentadiene-(1,3)-diethylphosphonate-(5) pass over between 130° and 132° C. as a viscous colorless oil.

20 parts of 30% sodium ethylate solution (ethanol as solvent) are added in a nitrogen atmosphere while stirring to a solution of 17 parts of 1-carbethoxy-2-methyl-pentadiene-(1,3)-diethylphosphonate-(5) and 4 parts of 2,7-dimethyl-octatriene-(2,4,6)-dial-(1,8) in 80 parts by volume of dimethylformamide at such a rate that the temperature does not rise above 35° C. The contents of the flask become dark brown in color and after a short time dark violet crystals are precipitated. The mixture is stirred for half an hour, then adjusted with glacial acetic acid to pH 7 and an equal volume of ethanol added. The crystals are filtered off by suction and recrystallized from ethyl acetate. There are obtained 3.7 parts of pure 1,18-bis-carbethoxy-2,7,12,17-tetramethyl-octadecanonaene-(1,3,5,7,9,11,13,15,17) (isonorbixin diethyl ester). The melting point is 194° to 195° C.

*Example 4*

A solution of 108 parts of 2,6-dimethyl-7-bromheptatriene-(1,3,5)-carboxylic acid ethyl ester-(1) in 40 parts of triethyl phosphite is dripped into 40 parts of triethyl phosphite heated to 140° C. The ethyl bromide formed during the reaction is distilled off through a column charged with filler bodies. After the reaction has ended, the mixture is fractionated in a high vacuum. From 145° to 147° C. at 0.02 mm. Hg there pass over 100 parts of 1-carbethoxy-2,6-dimethylheptatriene-(1,3,5)-diethylphosphonate-(1) as a viscous yellowish oil.

25 parts of 30% sodium ethylate solution (ethanol as solvent) are added in a nitrogen atmosphere while stirring to a mixture of 21 parts of beta-ionylidene-acetaldehyde, 35 parts of 1-carbethoxy-2,6-dimethyl-heptatriene-(1,3,5)-diethylphosphonate-(1) and 150 parts by volume of dimethylformamide in such a way that the temperature does not rise above 40° C. After cooling to room temperature, the mixture is adjusted to pH 7 with glacial acetic acid, ethanol and water are added and extracted with ether. The ether solution is washed, dried over sodium sulfate and concentrated. By recrystallization from ethanol there are obtained 12 parts of orange colored plates of homo-isopreno-vitamin A acid ethyl ester which melts at 133° C. Saponification with alcoholic aqueous potassium hydroxide leads to homo-isopreno-vitamin A acid which crystallize in orange colored leaflets of the melting point 195° to 197° C.

*Example 5*

114 parts of 30% sodium ethylate solution diluted with 40 parts by volume of dimethylformamide are added to a mixture of 115 parts of phosphonic acetic acid triethyl ester, 35 parts of crotonaldehyde and 70 parts by volume of dimethylformamide in such a way that the temperature of the mixture does not rise above 40° C. The reaction mixture is stirred until it has cooled to room temperature and then adjusted to pH 7 with glacial acetic acid. An equal volume of water is added to the reaction mixture and shaken with ether. The ether solution is washed, dried with sodium sulfate and concentrated. The residue is distilled under reduced pressure. From 87° to 90° C. at 17 mm. Hg there pass over 40 parts of ethyl sorbate. Saponification with alcoholic caustic potash leads to sorbic acid of the melting point 133° C.

*Example 6*

5 parts of 30% sodium methylate solution diluted with 5 parts by volume of dimethyl formamide are added to a mixture of 4.5 parts of phosphonic acetic acid triethyl ester, 2.5 parts of benzaldehyde and 10 parts by volume of dimethyl formamide. After 10 minutes, the same volume of water is added and the mixture extracted with ether. The ether solution is washed with water, dried and concentrated. The crude ethyl cinnamate is saponified by boiling with alcoholic potassium hydroxide for half an hour. By acidification with sulfuric acid, 3.2 parts of trans cinnamic acid of the melting point 136° C. are obtained.

*Example 7*

1000 parts of ethyl chloracetate are added at 110° C. to 1115 parts of trimethyl phosphite and the methyl chloride formed is expelled through a column provided with filler bodies. The mixture is heated for 2 hours at 180° C. and then distilled under reduced pressure. Between 158° C. and 160° C. at 21 mm. Hg there pass over 984 parts of carbethoxy-methyl-phosphonic acid dimethyl ester as a water clear liquid.

A solution of 41 parts of sodium hydroxide in 100 parts by volume of water is allowed to flow while stirring powerfully into a mixture of 200 parts of the above ester, 70 parts of crotonaldehyde, 50 parts by volume of ethanol and 50 parts by volume of water, at such a rate that the pH value of the solution amounts to about 7 and the reaction temperature does not rise above 40° C. After a short time ethyl sorbate separates as a yellowish oily layer. After the end of the inflow the whole is stirred for another half an hour, then adjusted to pH 7 with glacial acetic acid and an equal volume of water added. The reaction mixture is extracted with ether, and the ether solution is washed and dried, the ether evaporated and the residue distilled. At 41° C. at 0.05 mm. Hg there pass over 107 parts of ethyl sorbate as a water clear liquid with a pleasant aromatic odor.

*Example 8*

95 parts of 30% sodium methylate solution in methanol which has been diluted with 50 parts by volume of dimethyl-formamide are allowed to flow gradually with strong stirring into a solution of 90 parts of 2,6-dichlorbenzaldehyde and 100 parts of carbethoxy-methylphosphonic acid dimethyl ester in 150 parts by volume of dimethyl formamide at such a rate that the reaction temperature does not rise above 50° C. The reaction product is saponified without previous isolation by treatment with alkali and the 2,6-dichlorcinnamic acid is precipitated by acidification with 10% sulfuric acid. By recrystallization from glacial acetic acid, 98 parts of the pure product are obtained in the form of long colorless needles of the melting point 193° to 194° C.

*Example 9*

A solution of 50 parts of sodium hydroxide in 100 parts by volume of water is allowed to flow while stirring into a mixture of 50 parts of furfurol, 120 parts of phosphonic acetic acid triethyl ester, 50 parts by volume of methanol and 50 parts by volume of water in such a way that the internal temperature does not rise above 40° C. and the pH amounts to about 7. The reaction mixture is then acidified with 10% sulfuric acid. After half an hour, 2-furyl-beta-acrylic acid begins to crystallize out. The reaction mixture is stirred for another hour, an equal volume of water is added and filtered by suction. There are thus obtained 68 parts of almost colorless 2-furyl-beta-acrylic acid which after recrystallization from water with the addition of some animal carbon is obtained in colorless needles of the melting point 144° C.

*Example 10*

A mixture of 100 parts of 30% sodium methylate solution in methanol and 50 parts by volume of dimethylformamide is dripped into a solution of 75 parts of paranitrobenzaldehyde and 120 parts of carbmethoxy-methyl-phosphonic acid diethyl ester in 150 parts by volume of dimethylformamide while stirring. The internal temperature is held at about 40° C. Toward the end of the strongly exothermic reaction, para-nitrocinnamic acid ethyl ester is precipitated in yellowish needles. The reaction mixture is stirred for another half an hour, adjusted to pH 7 with glacial acetic acid, 100 parts by volume of methanol added, filtered by suction, the crystals washed with water and finally recrystallized from methanol. In this way 90 parts of para-nitrocinnamic acid methyl ester are obtained as beautiful needles of the melting point 163° C.

*Example 11*

A mixture of 10 parts of 30% sodium ethylate solution (ethanol as solvent) and 20 parts by volume of dimethylformamide are stirred in a nitrogen atmosphere into a mixture of 15 parts of 1-carbethoxy-2-methyl-propene-(1)-diethylphosphonate-(3), 9 parts of beta-ionylidene-acetaldehyde and 50 parts of dimethylformamide so rapidly that the temperature is held at 40° C. The reaction mixture is stirred for another half an hour, then adjusted to pH 7 with glacial acetic acid, an equal volume of water is added and the ethyl ester of vitamin A acid is extracted with petroleum ether (boiling point 60° to 80° C.). The extract is washed, dried and concentrated. 10.8 parts of the crude ethyl ester of vitamin A acid are obtained and by saponification thereof with alcoholic caustic potash solution, 7.9 parts of vitamin A acid of the melting point 173° to 175° C.

*Example 12*

500 parts by volume of absolute tert.butanol and 20 parts by weight of potassium are heated under reflux until the potassium has completely disappeared. To the solution of potassium tert.butylate thus prepared 115 parts by weight of phosphonic acetic acid triethyl ester are added dropwise at room temperature. The mixture is stirred for 2 hours away from moisture and then, stirring being continued, 80 parts by weight of methyl iodide are dripped in slowly. The mixture is gently heated, potassium iodide being separated in a finely crystalline form. The reaction mixture is allowed to stand for 2 days at room temperature, adjusted to pH 7 with glacial acetic acid, combined with a few drops of water to improve the separation of potassium iodide and filtered off by suction. The filtrate is distilled through a column under reduced pressure, 91 parts by weight of triethyl alpha-methylphosphone acetate being obtained as a colorless liquid at a temperature of 80° to 81° C. and a pressure of 0.2 mm. Hg.

4.3 parts by weight of 4,9-dimethyl-dodecapentaene-(2,4,6,8,10)-dial-(1,12) are dissolved in 200 parts by volume of dimethyl formamide and to this solution 15 parts by weight of triethyl alpha-methylphosphone acetate are added. Then a mixture of 11 parts by weight of a 30% ethanolic solution of sodium ethylate and 10 parts by volume of dimethyl formamide are added dropwise at 20° C. while stirring. Even after a few minutes crystallized crocetindiethyl ester separates. The reaction mixture is then further stirred for an hour, diluted with 200 parts by volume of ethanol, adjusted to pH 7 with glacial acetic acid, cooled down to 0° C. and filtered off by suction, 5.2 parts by weight of crocetindiethyl ester being obtained in the form of brilliant red leaflets which when recrystallized from benzene, melt at 215° to 217° C.

*Example 13*

270 parts of tributyl phosphite are heated to 150° C. 110 parts of methyl chloracetate are gradually dripped in. The butyl chloride formed is distilled off through a column. After all has been added, the contents of the flask are heated for an hour at 180° C. The low boiling constitutents are then removed in vacuo. The oily residue is taken up in 200 parts by volume of dimethylformamide and 100 parts of cyclohexanone added. Into this mixture there are dripped 200 parts of 30% sodium methylate solution in methanol at such a rate that the internal temperature is kept at 50° C. When the reaction has subsided, the whole is stirred for another hour, then diluted with 500 parts by volume of water, adjusted to pH 7 with sulfuric acid and then extracted with methylene chloride. After drying over sodium sulfate, the solvent is removed and the residue distilled in vacuo. 123 parts of cyclohexylidene-acetic acid methyl ester pass over between 53° and 54° C. at 0.4 mm. Hg as a colorless liquid.

*Example 14*

110 parts of methyl chloracetate are dripped at 150° C. into 230 parts of tri-isopropyl phosphite. The low boiling constituents formed are removed through a short column. The contents of the column, after all has been added, are heated for an hour at 180° C. Then the low boiling constituents of the reaction mixture are distilled off in a high vacuum. The oily residue, which is crude carbmethoxy-methyl-phosphonic acid dipropyl ester, is taken up in 200 parts by volume of N-methylpyrrolidone and 126 parts of cyclo-octanone are added. Into this mixture there are dripped while stirring intensively, 200 parts of 30% sodium methylate solution in methanol at such a rate that the internal temperature does not rise above 50° C. When the reaction has finished the whole is stirred for another hour. It is then diluted with 500 parts by volume of water, adjusted to pH 7 with sulfuric acid and then extracted with methylene chloride. After drying over sodium sulfate, the solvent is removed and the residue distilled in vacuo. 143 parts of cyclo-octyl-idene-acetic acid methyl ester pass over between 84° and 85° C. at 0.4 mm. Hg as a colorless oil.

*Example 15*

25 parts of magnesium methylate are added at 30° to 40° C. to a solution of 115 parts of carbmethoxymethyl-phosphonic acid diethyl ester and 75 parts of para-dimethylaminobenzaldehyde in 200 parts by volume of N-methylpyrrolidone. The mixture is stirred for 5 hours at 40° C., then diluted with 100 parts by volume of methanol and made neutral with glacial acetic acid. The para-dimethylamide cinnamic acid methyl ester thus precipitated is filtered off by suction and recrystallized from methanol. In this way 55 parts of the ester having the melting point 135° to 136° C. are obtained.

*Example 16*

4 parts of sodamide are slowly added to a mixture of 13.2 parts of cinnamaldehyde, 25 parts of carbmethoxy-methylphosphonic acid methyl ester and 100 parts by volume of obsolute benzene. Exothermic reaction sets in. After 1 hour the whole is diluted with 100 parts by volume of water and adjusted to pH 7 with glacial acetic acid. The benzene layer is separated, washed, dried and then concentrated.

The product is recrystallized from petroleum ether with the addition of a little animal carbon. 16 parts of cinnamalacetic acid methyl ester of the melting point 69° to 70° C. are thus obtained.

Example 17

75 parts of methyl glyoxal diethyl acetal and 125 parts of carbethoxy-methyl-phosphonic acid diethyl ester are mixed with 100 parts by volume of water and 100 parts by volume of ethanol. Then while stirring intensively, a solution of 15 parts of lithium hydroxide in 50 parts by volume of water is dripped in. The reaction mixture is kept at +10° C. by cooling. After all the alkali has been added the whole is stirred for another hour. Then the product is poured into 1000 parts by volume of water and extracted with methylene chloride. The extract is washed with water, dried over sodium sulfate and concentrated. The residue is distilled in vacuo. 73 parts of 1-carbethoxy-2-methyl-3,3-diethoxypropene-(1) pass over between 120° and 123° C. at 14 mm. Hg.

Example 18

A suspension of 95 parts of barium hydroxide in 200 parts by volume of water is dripped with intensive stirring into a mixture of 70 parts of crotonaldehyde, 20 parts by volume of methanol, 100 parts by volume of water and 110 parts of carbmethoxy-methyl-phosphonic acid diethyl ester. The contents of the flask are kept at 0° C. by external cooling. After all the alkali has been added, the whole is stirred for another hour, then diluted with 500 parts by volume of water and extracted with methylene chloride. The extract is washed with water, dried with sodium sulfate and then concentrated. The residue is distilled in vacuo through a short column. 82 parts of methyl sorbate pass over between 37° and 38° C. at 0.05 mm. Hg as a water clear liquid.

Example 19

22 parts of potassium are dissolved at 80° C. in 500 parts of absolute tert.butanol. The resultant solution of potassium tert.butylate is dripped with powerful stirring into a solution of 75 parts of piperonal and 120 parts of carbmethoxy-methyl-phosphonic acid diethyl ester in 200 parts by volume of dimethyl sulfoxide. The inflow is regulated so that the temperature of the reaction mixture never rises above 50° C. When all has been added the whole is stirred for another hour and adjusted to pH 7 with glacial acetic acid. Water is then added until the piperonylacrylic acid methyl ester crystallizes out. The product is filtered off by suction and recrystallized from methanol. 63 parts of piperonylacrylic acid methyl ester are thus obtained as colorless crystals which melt at 136° C. to 138° C.

Example 20

200 parts of a 30% solution of sodium methylate in methanol are allowed to flow into a mixture of 58 parts of acetone, 220 parts of carbmethoxy-methyl-phosphonic acid diethyl ester and 200 parts by volume of dimethyl formamide at 30° to 40° C. When all of the alkali has been added, the reaction mixture is stirred at room temperature for 2 hours, then neutralized to pH 7 with glacial acetic acid, combined with an equal amount of water and extracted with ether. The ethereal solution is washed, dried with sodium sulfate and then concentrated by evaporation of the ether. The residue is distilled, 89 parts of beta,beta-dimethylacrylic acid methyl ester passing over as a colorless liquid between 137° and 139° C. at a pressure of 740 mm. Hg.

Example 21

70 parts of carbmethoxy-methyl-phosphonic acid diethyl ester are added to a mixture of 45 parts of benzophenone, 17 parts of sodium methylate and 200 parts by volume of N-methylpyrrolidone. The mixture is heated at 100° C. for one hour, then combined with an equal amount of water, neutralized to pH 7 with glacial acetic acid and extracted with ether. The ethereal solution is washed, dried with sodium sulfate and then concentrated by evaporation of the ether. The residue is distilled at reduced pressure, 46 parts of beta,beta-diphenylacrylic acid methyl ester passing over as a colorless oil between 134° and 136° C. at a pressure of 0.2 mm. Hg.

Example 22

120 parts of a 30% solution of sodium ethylate in methanol are allowed to flow into a mixture of 97 parts of dihydro-beta-ionone (4-(2',6',6'-trimethylcyclohexen-(1')-yl-(1')-butanone-(2)), 160 parts of 1-carbethoxy-2-methyl-pentadiene-(1,3)-diethylphosphonate-(5) and 300 parts by volume of dimethyl formamide at 40° C. under nitrogen. When all of the alkali has been added, the mixture is stirred for one hour, combined with an equal amount of water, neutralized to pH 7 with glacial acetic acid and extracted with ether. The ethereal solution is washed, dried with sodium sulfate and concentrated by evaporation, and the residue is distilled in high vacuum under nitrogen, 78 parts of 7-dihydro-vitamin A acid ethyl ester passing over as a pale yellow viscous oil between 158° and 160° C. at a pressure of 0.01 mm. Hg.

Example 23

45 parts of a 30% solution of sodium ethylate in ethanol are allowed to flow into a mixture of 38 parts of beta-ionone, 60 parts of 1-carbethoxy-2-methyl-pentadienyl-(1,3)-diethyl-phosphonate-(5) and 150 parts by volume of dimethyl formamide at room temperature under nitrogen. When all the alkali has been added, the reaction mixture is stirred for three hours, then combined with an equal amount of water, neutralized to pH 7 with glacial acetic acid and extracted with ether. The ethereal solution is washed, dried and concentrated by evaporation of the ether, and the residue is fast distilled in high vacuum under nitrogen, 32 parts of vitamin A acid ethyl ester passing over as a viscous yellow oil between 178° and 180° C. at a pressure of 0.2 mm. Hg. The product solidifies to crystals having the melting point 49° to 50° C.

Example 24

96 parts of gamma-bromotiglic acid methyl ester are added to 91 parts of triethylphosphite at from 140° to 150° by portions and the resultant ethyl bromide is distilled off in a packed tower. The mixture is then heated to 180° to 190° C. for one hour and then distilled at reduced pressure, 95 parts of 1-carbmethoxy-1-methyl-propene-(1)-diethyl-phosphonate-(3) passing over as a pale yellow oily liquid between 115° and 117° C. at a pressure of 0.1 mm. Hg.

40 parts of a 30% solution of sodium methylate in methanol are added to a solution of 53 parts of 1-carbmethoxy-1-methyl-propene -(1)- diethyl-phosphonate -(3) and 16.4 parts of 2,7-dimethyloctatriene - (2,4,6) - dial-(1,8) in 200 parts by volume of dimethyl formamide at from 0° to +5° C. while intensely stirring, the mixture assuming a dark-brown coloration. Crystals separate after a few minutes. The reaction mixture is stirred for one hour, neutralized to pH 7 with glacial acetic acid and combined with 150 parts by volume of methanol. The precipitate is filtered off by suction and recrystallized from ethyl acetate. In this manner, 20.4 parts, i.e., 57.3% of the theory, of crocetindimethyl ester are obtained in the form of red rhombic leaflets with a melting point of from 224° to 226° C.

Example 25

To a solution, having a temperature of 50° C., of 12 parts of anthraquinone-2-aldehyde and 12 parts of 1-carbomethoxy-methyl-phosphonic acid diethyl ester in 150 parts by volume of dimethylformamide 10 parts of a 30% solution of sodium methylate in methanol are added in small portions while intensely stirring. The mixture is stirred for one hour, neutralized to pH 7 with glacial acetic acid and combined with 50 parts by volume of methanol. The precipitate is filtered off by suction and recrystallized from glacial acetic acid. In this manner 8.6 parts of beta-(2-anthraquinonyl)-acrylic acid methyl ester are obtained in the form of colorless lancet shaped leaflets melting at 196° to 197° C.

*Example 26*

To a mixture of 70 parts of vinyl methyl ketone, 235 parts of phosphonacetic acid triethyl ester, 100 parts by volume of water and 150 parts by volume of ethanol a solution of 40 parts of sodium hydroxide in 200 parts by volume of water is added while intensely stirring. The reaction mixture is kept at a temperature of between 0° and 5° C. by cooling. When the addition of alkali is complete the mixture is stirred for another hour, then combined with 500 parts by volume of water and extracted with methylene chloride. The extract is washed with water, dried with sodium sulfate and concentrated by evaporation. The residue is distilled at reduced pressure, 12 parts of 2-methyl-butadiene-(1,3)-carboxylic acid-(1) ethyl ester passing over as a colorless liquid at a temperature of 71° to 75° C. and a pressure of 12 mm. Hg. The ultraviolet absorption spectrum in cyclohexane shows a maximum at 253μ. As distillation residue major quantities of resinous products are obtained.

*Example 27*

To a mixture of 100 parts of a 30% aqueous solution of formaldehyde, 210 parts of carbomethoxy-methyl-phosphonic acid diethyl ester, 100 parts by volume of water and a trace of hydroquinone a solution of 40 parts of sodium hydroxide in 200 parts by volume of water is added in portions while intensely stirring. The reaction mixture is kept at from 0° to 5° C. by cooling. The mixture is stirred for another hour, combined with 200 parts by volume of water, continuously neutralized with acetic acid and extracted with methylene chloride. The extract is washed with some water, dried with sodium sulfate and concentrated at reduced pressure while adding a trace of phenothiazine. From the residue at between 75° and 78° C., 6.3 parts of acrylic acid methyl ester distil over as a colorless liquid.

*Example 28*

36 parts of chloracetic acid methyl ester are added to 66 parts of phenyldiethoxy phosphine at 140° to 150° C. by portions and the ethyl chloride formed is distilled off in a packed tower. When the addition is complete the reaction mixture is heated to 180° to 200° C. for 30 minutes and then distilled at reduced pressure, 68 parts of carbomethoxy-methyl-phenylphosphinic acid ethyl ester passing over as a colorless oily liquid at a temperature of 120° to 122° C. and a pressure of 0.01 mm. Hg.

25 parts of carbomethoxy - methyl - phenylphosphinic acid ethyl ester and 15 parts of p-nitrobenzaldehyde are dissolved in 50 parts by volume of dimethyl formamide and 20 parts of a 30% solution of sodium methylate in methanol are slowly run into this solution at from 30° to 40° C. while stirring. Toward the end of the strongly exothermic reaction p-nitrocinnamic acid methyl ester precipitates in the form of pale yellow needles. The reaction mixture is stirred for another 30 minutes, then adjusted to pH 7 with glacial acetic acid and combined with 50 parts by volume of methanol. The separated crystals are filtered off by suction, washed with water and recrystallized from methanol, 18 parts of p-nitrocinnamic acid methyl ester being obtained as beautiful needles with the melting point 163° C.

*Example 29*

25 parts of carbomethoxy-methyl-phenylphosphinic acid ethyl ester and 15 parts of p-dimethylaminobenzaldehyde are dissolved in 50 parts by volume of dimethyl formamide and to this solution 20 parts of a 30% solution of sodium methylate in methanol is slowly added dropwise at between 30° and 40° C. while stirring. Toward the end of the exothermic reaction p-dimethylaminocinnamic acid methyl ester precipitates in the form of yellow leaflets. The reaction mixture is further stirred for 30 minutes, then adjusted to pH 7 with glacial acetic acid and combined with 50 parts by volume of methanol. The crystals formed are filtered off by suction, washed with water and recrystallized from ethanol, 19 parts of p-dimethylaminocinnamic acid methyl ester being obtained in the form of leaflets with a green-yellow fluorescence (melting point 137° C.).

*Example 30*

84 parts of gamma-bromo-beta-methylcrotonic acid ethyl ester are added to 90 parts of phenylphosphonous acid diethyl ester, heated to 130° C. by portions and the ethylbromide formed is distilled off in a packed tower. The reaction mixture is then heated to 180° C. and any lower-boiling fractions are extracted at reduced pressure. There are obtained 104 parts of crude 1-carbethoxy-2-methyl-propene-(1)-ethyl phenylphosphinate-(3) as a yellow viscous oil.

62 parts of the crude phosphinate and 44 parts of beta-ionylidene acetaldehyde are dissolved in 150 parts by volume of dimethylformamide and to this solution 50 parts of a 30% solution of sodium ethylate in ethanol are added under nitrogen at room temperature. When all of the alkali has been added, the reaction mixture is stirred for an hour, then combined with an equal amount of water, neutralized to pH 7 with glacial acetic acid and extracted with petroleum ether. The solution in petroleum ether is washed, dried and concentrated by evaporation and the residue is recrystallized from ethanol under nitrogen. There are obtained 41 parts of vitamin A acid ethyl ester with the melting point 49° to 50° C. This ester can be reduced to vitamin A by the method of O. Isler and M. Montavon (Chimia 12, 3 (1958)).

*Example 31*

193 parts of gamma-bromotiglic acid methyl ester are added to 150 parts of methylphosphonous acid diethyl ester at 100° to 110° C. by portions and the ethylbromide is distilled off in a packed tower. The mixture is then heated to 150° to 160° C. for 30 minutes and any low-boiling fractions are withdrawn at reduced pressure. There are obtained 137 parts of crude 1-carbethoxy-1-methyl-propene-(1)-ethyl methylphosphinate-(3) as a yellowish oil.

40 parts of the phosphinate obtained by the method described in the foregoing paragraph and 16.4 parts of 2,7-dimethyloctatriene-(2,4,6)-dial-(1,8) are dissolved in 200 parts by volume of dimethylformamide and to this solution 40 parts of a 30% solution of sodium methylate in methanol is added at 0° to 5° C. with intense agitation. From the dark-brown mixture crystals separate after a few minutes. The mixture is stirred for 30 minutes, neutralized with glacial acetic acid to pH 7 and then combined with 150 parts of methanol. The precipitate is filtered off by suction and recrystallized from ethyl acetate, 19.2 parts of crocetin dimethyl ester being obtained as red rhombic leaflets having the melting point 223° to 225° C.

This application is a continuation-in-part of our copending application Serial No. 846,823, filed October 16, 1959, now abandoned.

What we claim is: 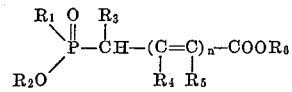

1. A process for the production of alpha,beta-unsaturated carboxylic acid esters wherein a carbonyl-containing compound selected from the group consisting of aldehydes and ketones of 1 to 30 carbon atoms and 1 to 2 carbonyl groups is reacted with a compound of the formula:

$$\begin{array}{c} R_1 \quad O \quad R_3 \\ \diagdown \| \quad | \\ P-CH-(C=C)_n-COOR_6 \\ \diagup \quad | \quad | \\ R_2O \quad R_4 \quad R_5 \end{array}$$

in which $R_1$ represents a member of the class consisting of alkyl of from 1 to 4 carbon atoms, alkoxy of from 1 to 4 carbon atoms, phenyl, naphthyl and further members in which said phenyl and naphthyl are substituted 1 to 2 substituents selected from the group consisting of alkyl of 1 to 4 carbon atoms, halogen and alkoxy of 1 to 4 carbon atoms; $R_2$ is an alkyl of 1 to 4 carbon atoms; $R_3$, $R_4$ and $R_5$ each represent a substituent selected from the group consisting of alkyl of 1 to 4 carbon atoms and hydrogen; $R_6$ represents alkyl of 1 to 10 carbon atoms; and $n$ is a number of from 0 to 4, in the presence of a basic compound capable of acting as a proton acceptor.

2. The process as claimed in claim 1 wherein the reaction is carried out in an inert solvent.

3. The process as claimed in claim 1 wherein a member of the group consisting of alkali alcoholates, alkaline earth alcoholates, alkali hydroxides, alkaline earth hydroxides, alkali amides, alkaline earth amides, alkali hydrides and alkaline earth hydrides, is used as proton acceptor.

4. The process as claimed in claim 2 wherein the solvent is a polar solvent.

5. The process as claimed in claim 4 wherein a solvent selected from the group consisting of dimethyl formamide, N-methyl pyrrolidone and dimethyl sulfoxide is used.

6. The process as claimed in claim 1 wherein the reaction is carried out at a temperature between about $-30°$ C. and $+180°$ C.

References Cited in the file of this patent

UNITED STATES PATENTS 3,009,921     Stilz et al.  ---------------- Nov. 21, 1961

OTHER REFERENCES

Horner et al.: "Chem. Ber.," vol. 91, pages 61–63 (1958).

Horner et al.: "Chem. Ber.," vol. 92, pages 2499 to 2505 (Oct. 13, 1959).

Campbell et al.: "Journal Org. Chem.," vol. 24, pages 1246–1251 (September 1959).

IRVING MARCUS, *Primary Examiner.*

M. LIEBMAN, DUVAL T. McCUTCHEN, WALTER A. MODANCE, *Examiners.*